(12) United States Patent  
Grossman

(10) Patent No.: US 11,930,946 B1  
(45) Date of Patent: Mar. 19, 2024

(54) PORTABLE TOOTHPICK DISPENSER

(71) Applicant: PIXOTINE PRODUCTS, INC., Jupiter, FL (US)

(72) Inventor: Evan T. Grossman, Jupiter, FL (US)

( * ) Notice: Subject to any disclaimer, the term of this patent is extended or adjusted under 35 U.S.C. 154(b) by 411 days.

(21) Appl. No.: 16/878,154

(22) Filed: May 19, 2020

Related U.S. Application Data

(63) Continuation-in-part of application No. 29/612,154, filed on Jul. 28, 2017, now Pat. No. Des. 884,437.

(51) Int. Cl.
*A47G 21/12* (2006.01)
*A24F 47/00* (2020.01)
*A61C 15/02* (2006.01)
*A61C 19/06* (2006.01)

(52) U.S. Cl.
CPC .............. *A47G 21/12* (2013.01); *A24F 47/00* (2013.01); *A61C 15/02* (2013.01); *A61C 19/063* (2013.01)

(58) Field of Classification Search
CPC . A61C 19/02; A61C 16/0093; A61C 15/0093; A61C 15/02; A61C 19/063; B65D 83/02; B65D 2200/108; A47G 21/12; A44F 47/00
USPC ........... 221/232, 1; 206/363, 370, 382, 63.5, 206/362.4, 362.45, 362, 45; 401/183
See application file for complete search history.

(56) References Cited

U.S. PATENT DOCUMENTS

| | | | | |
|---|---|---|---|---|
| 1,982,112 A * | 11/1934 | Lang | ...................... | B65D 85/20 206/380 |
| 3,165,249 A * | 1/1965 | Peck | ...................... | A24F 15/20 206/820 |
| 3,343,669 A * | 9/1967 | Loran | ..................... | A61C 19/02 206/63.5 |
| 3,441,165 A * | 4/1969 | Zampichelli | ........... | B65D 83/02 220/784 |
| 3,647,057 A * | 3/1972 | Ashmead | ............... | B65D 85/24 220/345.2 |
| 3,815,734 A * | 6/1974 | Kruckel | .................. | A45C 11/34 220/507 |
| 4,265,369 A * | 5/1981 | Aboussouan | ...... | G11B 23/0233 221/87 |
| 4,784,267 A * | 11/1988 | Gessler | .................... | B65D 1/36 220/555 |
| 5,005,698 A * | 4/1991 | Mikhail | ............. | B65D 85/1009 206/820 |
| 5,425,450 A * | 6/1995 | Lin | ..................... | G11B 33/0427 |

(Continued)

FOREIGN PATENT DOCUMENTS

| | | | | |
|---|---|---|---|---|
| FR | 2809944 A1 * | 12/2001 | ............. | A47G 21/12 |
| JP | 2012075765 A * | 4/2012 | ............. | A47G 21/12 |
| WO | WO-2022026437 A1 * | 2/2022 | ............. | B65D 25/04 |

*Primary Examiner* — Rakesh Kumar

(74) *Attorney, Agent, or Firm* — Glenn E. Gold, P.A.; Glenn E. Gold

(57) ABSTRACT

A portable toothpick dispenser particularly suited for storing and dispensing nicotine-infused toothpicks incorporates a child-resistant housing closure for preventing access to toothpicks stored within an interior toothpick storage space. Front and rear housing portions are contiguous with one another via a living hinge located along aligned housing sides to form a clamshell-like housing structure. Disengagement of a housing closure locking structure requires a user to simultaneously press central portions of corresponding front and rear housing portion bodies inwardly toward one another.

9 Claims, 6 Drawing Sheets

(56) References Cited

U.S. PATENT DOCUMENTS

| | | | | |
|---|---|---|---|---|
| 5,492,616 A * | 2/1996 | Cook | .................... | B65D 27/00 |
| | | | | 220/4.23 |
| 5,513,774 A * | 5/1996 | Dominquez | ....... | B65D 83/0409 |
| | | | | 221/268 |
| 5,649,642 A * | 7/1997 | Mabry | ................. | B65D 83/087 |
| | | | | 221/268 |
| 5,664,674 A * | 9/1997 | Lynch, Jr. | ............. | B65D 85/24 |
| | | | | 206/382 |
| 5,947,294 A * | 9/1999 | Omata | .................... | G09F 3/20 |
| | | | | 220/523 |
| 6,044,848 A * | 4/2000 | Huang | .................. | B65D 75/14 |
| | | | | 206/113 |
| 6,205,611 B1 * | 3/2001 | Vigil | ................. | A46B 11/0003 |
| | | | | 206/439 |
| 6,247,595 B1 * | 6/2001 | Omata | .................. | A45C 11/24 |
| | | | | 220/837 |
| 7,654,388 B2 * | 2/2010 | Catron | ................. | A61J 1/1437 |
| | | | | 220/345.2 |
| 7,798,329 B2 * | 9/2010 | Gelardi | ............. | B65D 83/0463 |
| | | | | 206/536 |
| 10,123,611 B2 * | 11/2018 | Friedt | .................... | A61C 15/02 |
| 2004/0182877 A1 * | 9/2004 | Oroumieh | ............. | A47G 21/12 |
| | | | | 221/92 |
| 2005/0155873 A1 * | 7/2005 | Cohen | ................... | A61C 15/02 |
| | | | | 206/37 |
| 2005/0255197 A1 * | 11/2005 | Aldridge | ............... | B65D 71/40 |
| | | | | 426/108 |
| 2014/0014677 A1 * | 1/2014 | Chan | ................. | A61B 5/14532 |
| | | | | 221/232 |
| 2014/0224825 A1 * | 8/2014 | Studney | ................ | B65D 83/02 |
| | | | | 221/1 |

\* cited by examiner

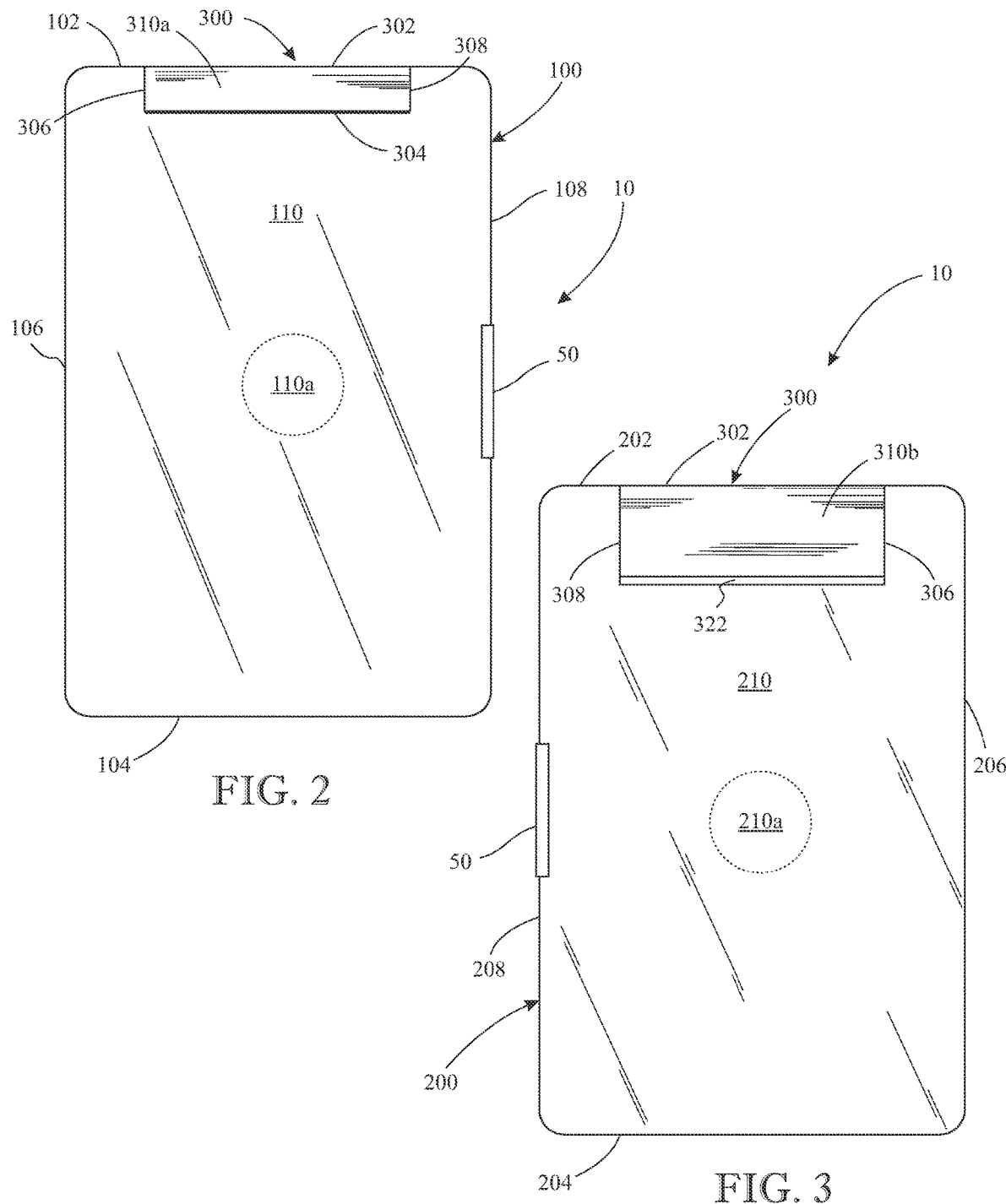

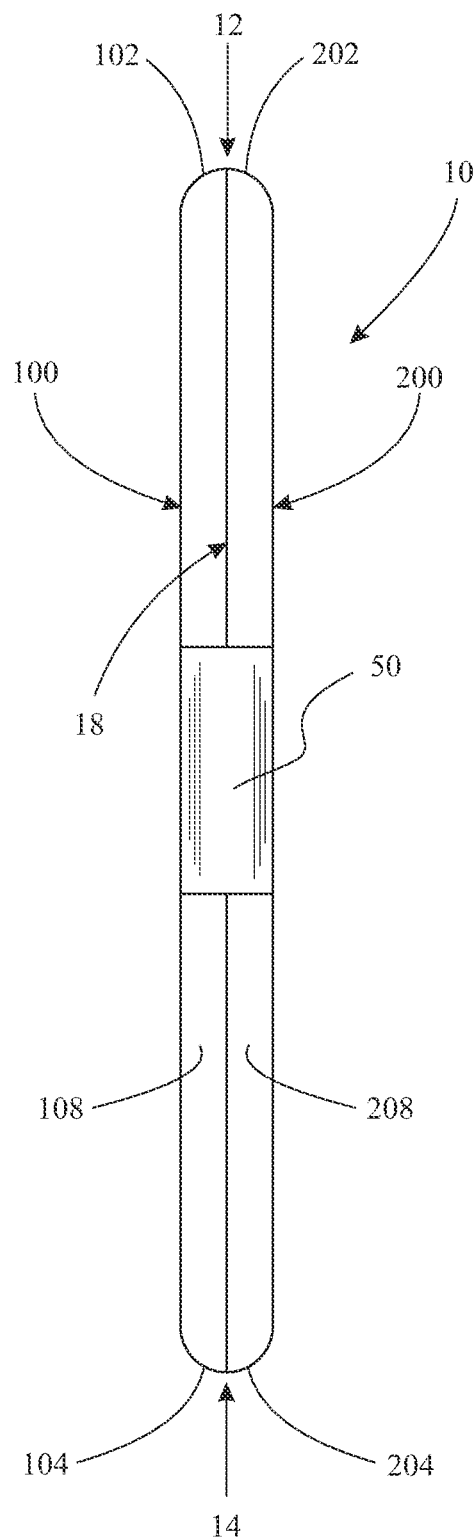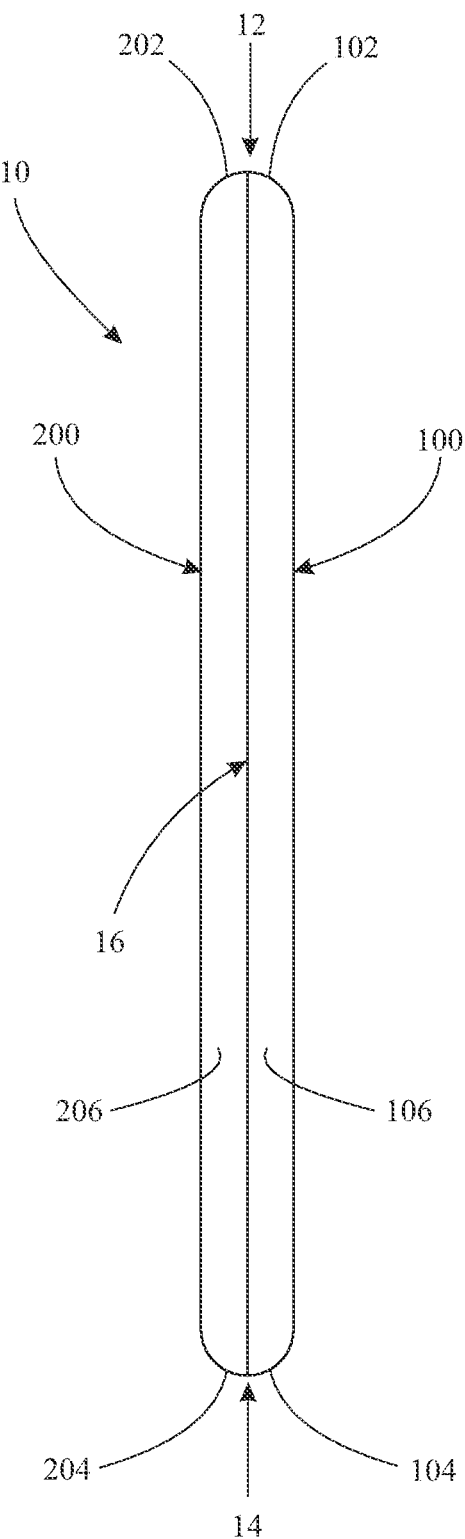

PORTABLE TOOTHPICK DISPENSER

CROSS-REFERENCE TO RELATED APPLICATION(S)

This U.S. utility patent application is a continuation-in-part of, and claims the benefit of, U.S. design patent application Ser. No. 29/612,154, filed Jul. 28, 2017 and issuing on May 19, 2020 as U.S. Patent No. D884437.

FIELD OF THE INVENTION

The present invention relates generally to toothpick dispensers. More particularly, the invention pertains to a portable toothpick dispenser having an integral child resistant closure, which is particularly well-suited for efficiently and hygienically dispensing flavor-infused and/or nicotine-infused toothpicks.

BACKGROUND OF THE INVENTION

Conventional toothpicks are well known for use removing food particles lodged between the teeth, removing plaque buildup on teeth, and the like. Such conventional toothpicks incorporating various flavorings have also become very popular over the years. Some such flavorings, such as mint flavoring, may provide an added benefit of providing fresh breath to a user. More recently, there has been an emerging trend to provide nicotine-infused toothpicks for delivering a nicotine dosage to individuals as an alternative to the less healthy smoking of a cigarette. Such toothpicks provide the user with nicotine satisfaction without many of the health consequences of conventional cigarette smoking. The use of a toothpick as the nicotine delivery vehicle has the added benefit of addressing the oral fixation element craved by most smokers—without the cigarette. Often, nicotine and flavorings are combined as part of the toothpick infusion.

The infused nicotine is typically transmitted via contact, and subsequent absorption, into the bloodstream via the mouth. Once absorbed into the bloodstream, nicotine stimulates the release of chemicals, such as epinephrine (adrenaline) and dopamine, from regions of the brain controlling feelings of pleasure and motivation. It is well known that nicotine is an addictive substance that young children should not have access to. With the relatively recent advent of nicotine-infused toothpicks, a need has arisen for portable nicotine-infused toothpick dispensers that facilitate the dispensing of such toothpicks while concurrently minimizing access by curious young children.

Conventional toothpick dispensers incorporate dispensing mechanisms that are not designed with any such safety features in mind. Accordingly, existing toothpick dispensers do not incorporate child-proof mechanisms to prevent access, particularly by young children, to toothpicks contained within the dispenser. For example, a popular toothpick dispenser structure incorporates an open box-type structure with a rotatable knob which, via rotation of the knob, dispenses a single toothpick into a pair of extended arms following each such knob rotation. Another popular existing toothpick dispenser incorporates a mechanism whereby upon applying slight pressure to a handle or other structure, a toothpick is dispensed. In addition to their lack of child-proof features, such dispensers are prone to jamming. Furthermore, they are not designed for portability.

More simplistic toothpick dispensers are known which have the general form of a clear container (e.g. a cylindrical container) having a threaded cap screwed on to the open container top, wherein the top incorporates apertures for enabling the discharge of toothpicks from the closed container. However, such dispensers are difficult to use and often prone to jamming. Furthermore, removal of toothpicks from such dispensers—usually by means of tapping the dispenser with the hand while the dispenser is an upside-down orientation—is often frustrating and can lead to user hand injuries.

Conventional dispensers, such as those just described, often incorporate an alternate means for enabling a user to access an interior space (i.e. typically for loading the dispenser with new toothpicks). Oftentimes, as a result of difficulties involved with efficiently dispensing toothpicks from conventional dispensers, frustration leads individuals to use the alternate interior access means to obtain a toothpick from the interior space. This leads to hygiene-related issues as users, often by necessity, contact other toothpicks within the container which are later dispensed by a different individual. Furthermore, the mere removal of such a secondary access (e.g. a threaded container cap) exposes all of the contained toothpicks to germs and the like. Since conventional toothpick dispensers maintain the stored toothpicks together such that adjacent toothpicks contact one another, one dirty or germ-ridden toothpick is likely to lead to some or all of the remaining toothpicks becoming unhygienic.

Known packaging specifically designed for containment of flavor- and/or nicotine-infused toothpicks have their respective drawbacks, disadvantages, and limitations. Infused toothpicks are usually deposited in foil packaging intended for one-time usage. Typically, foil packages do not enable effective resealing of the contained toothpick(s), making them inconvenient to use and often leading to spillage of the entire contents, which may have the undesirable consequence of altering the concentration of a toothpick flavor, or blend. They also do not provide any effective means of preventing access to the contents by young children.

Accordingly, there is a need for a portable toothpick dispenser that overcomes the aforementioned drawbacks, disadvantages and limitations of existing toothpick dispensers. It would be highly desirable to provide such an improved portable toothpick dispenser in the form of a unitary molded structure lending itself to cost effective manufacture.

BRIEF SUMMARY OF THE INVENTION

The present disclosure is generally directed to a toothpick dispenser that is particularly well suited for the storage and selective dispensing of nicotine-infused toothpicks via the incorporation of a child-resistant housing closure preventing access to—and thereby dispensing of—toothpicks stored within an interior of the housing. Front and rear housing portions are contiguous with one another via a living hinge located along aligned housing sides to define a clamshell-like housing structure. Disengagement of a housing closure locking mechanism requires a user to simultaneously press central portions of corresponding front and rear housing portion bodies inwardly toward one another in order to gain access.

In accordance with an exemplary implementation, a portable toothpick dispenser is provided including: a rear housing portion in the form of a generally rectangular rear panel member transitioning, along a rear panel member perimeter, to a forwardly-extending rear panel perimeter sidewall having a leading edge, an upper end of said rear panel member having a laterally-extending central notch provided therein, a lower edge of the central notch transitioning, via a living hinge, to a child-resistant housing closure; and a front housing portion in the form of a generally rectangular front panel member transitioning, along a front panel member perimeter, to a rearwardly-extending front panel perimeter sidewall having a leading edge, an upper end of the front panel member having a laterally-extending, recessed housing closure engagement structure configured for selective locking engagement with the child-resistant housing closure when the portable toothpick dispenser is in a fully-assembled state, a right side of the front panel member adjoined to a corresponding right side of the rear panel member by a living hinge.

In at least some implementations, the portable toothpick dispenser may further include: a plurality of annular bosses formed upon an interior surface of one of the front and rear panel members; and a plurality of snap inserts formed upon an interior surface of the other one of the front and rear panel members, wherein, when the portable toothpick dispenser is in a fully-assembled state, the plurality of snap inserts frictionally engage the plurality of annular bosses to fixedly attach the front and rear panel members to one another to define a toothpick interior storage cavity.

In at least some implementations, the front panel member may include a plurality of interior structural reinforcement walls spanning interior corners of the front panel member, and the rear panel member may include a plurality of corresponding interior structural reinforcement walls spanning interior corners of the rear panel member.

In at least some implementations, a series of toothpick separator walls may be provided projecting upwardly from an interior surface of a lower end length of the rear panel perimeter sidewall. Furthermore, a corresponding series of toothpick separator walls may be provided projecting upwardly from an interior surface of a lower end length of the front panel perimeter sidewall, such that, when the toothpick dispenser is in a fully-assembled state, the first series of toothpick separator walls are aligned with and directly engage the corresponding second series of toothpick separator walls to define a series of toothpick receiving slots.

In at least some implementations, the child-resistant housing closure may be rotatable about its living hinge between a locked, closed state, wherein access to the toothpick interior storage space is precluded, and an unlocked, open state, wherein a user may access toothpicks within the toothpick interior storage space.

In at least some implementations, the child-resistant closure may be provided in the form of a J-shaped body having a rear planar portion attached at its lower end, via the living hinge, to the lower edge of the laterally-extending central notch in the upper end of the rear panel member, and the rear planar portion may transition to an inwardly curved upper end portion, which, in turn, may transition to a front planar portion terminating at a leading edge.

In at least some implementations, a first locking feature may be provided projecting from an interior surface of the front planar portion of the J-shaped closure body.

In at least some implementations, the laterally-extending, recessed housing closure engagement structure at the upper end of the front panel member may include a laterally-extending wall having a second locking feature projecting from a front surface thereof, such that the first and second locking features are selectively engageable with one another between an engaged, locked configuration and a disengaged, unlocked configuration.

In at least some implementations, disengagement of the first and second locking features may require that a user simultaneously presses central areas of corresponding front and rear panel members inwardly toward one another.

BRIEF DESCRIPTION OF THE DRAWINGS

The preferred embodiments of the invention will hereinafter be described in conjunction with the appended drawings provided to illustrate and not to limit the invention, in which:

FIG. 2 is a front elevation view of the portable toothpick dispenser introduced in FIG. 1;

FIG. 3 is a rear elevation view of the portable toothpick dispenser introduced in FIG. 1;

FIG. 4 is a right side elevation view of the portable toothpick dispenser introduced in FIG. 1;

FIG. 5 is a left side elevation view of the portable toothpick dispenser introduced in FIG. 1;

Like reference numerals refer to like parts throughout the several views of the drawings.

DETAILED DESCRIPTION OF EXEMPLARY IMPLEMENTATION(S)

Figure 1:
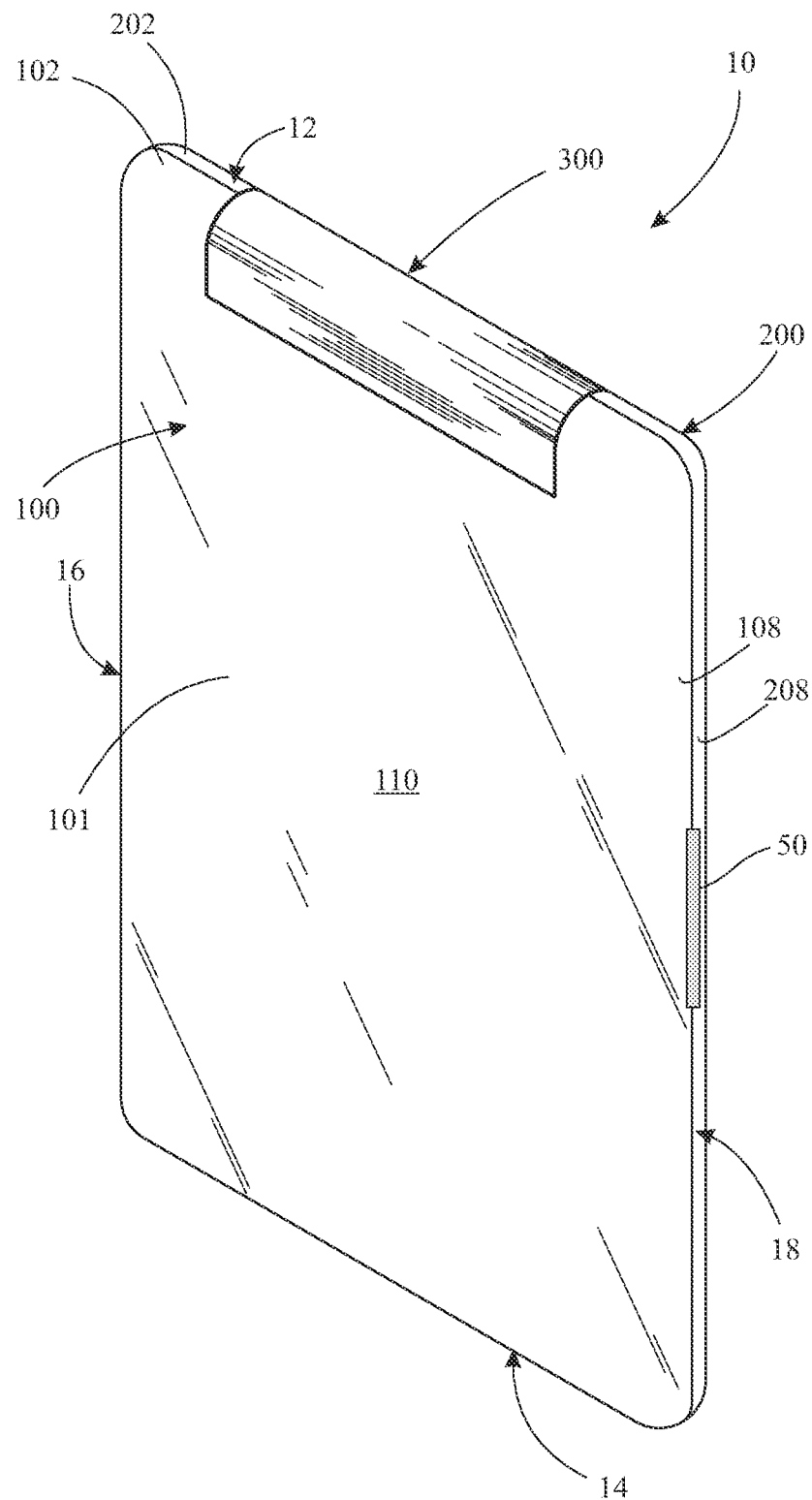
FIG. 1 is an upper-front-right perspective view of a fully constructed portable toothpick dispenser shown in a closed and locked configuration, in accordance with at least one exemplary implementation of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "right," "front," "rear," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
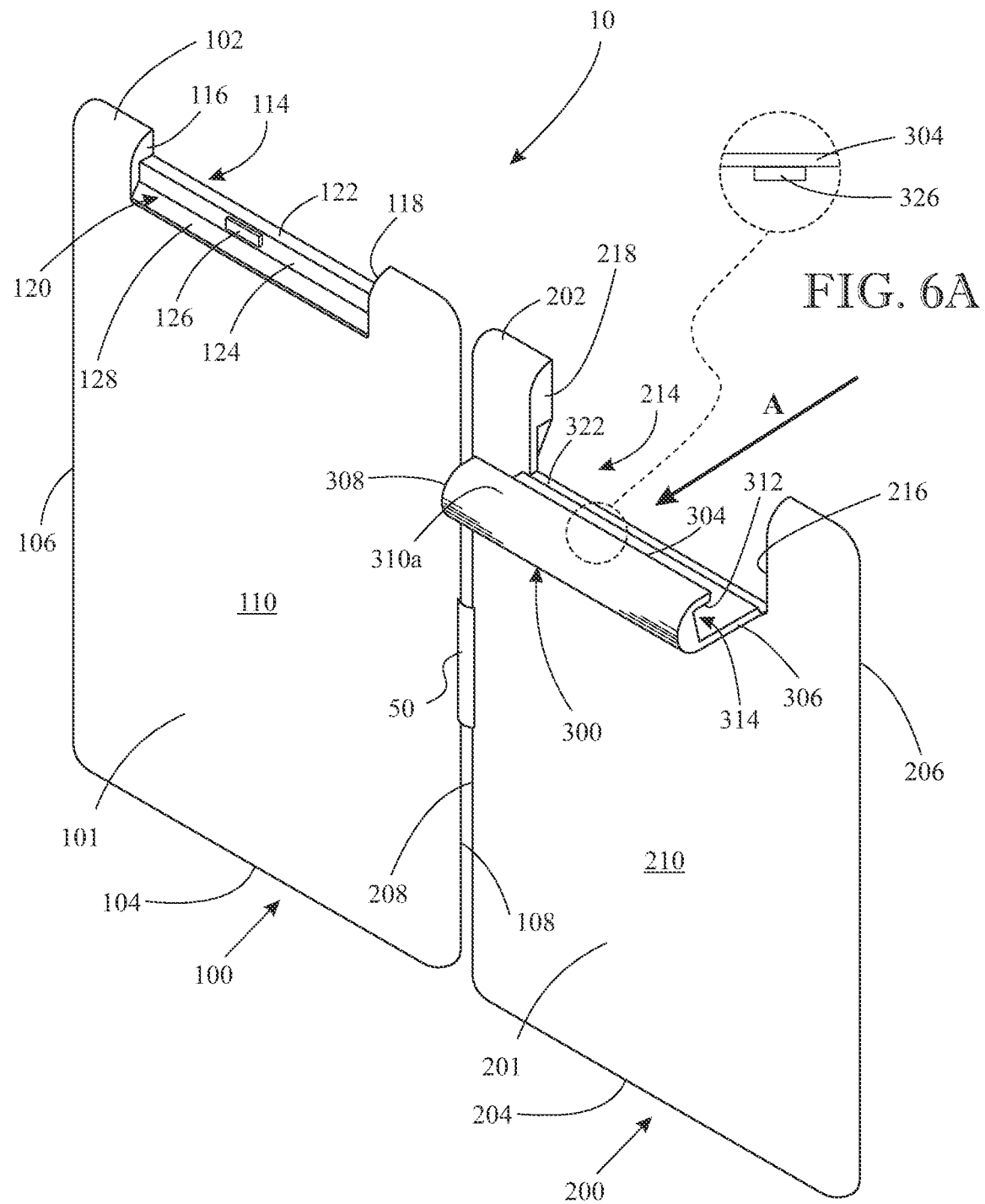
FIG. 6 is an upper-right-front side perspective view of portable toothpick dispenser 10 with rear housing 200 shown detached from front housing 100 and rotated clockwise about living hinge 50 to display the exterior surfaces, 110 and 210, of side-by-side front and rear housings, 100 and 200, respectively, and with child resistant closure 300 in an open and unlocked state.
Figure 7:
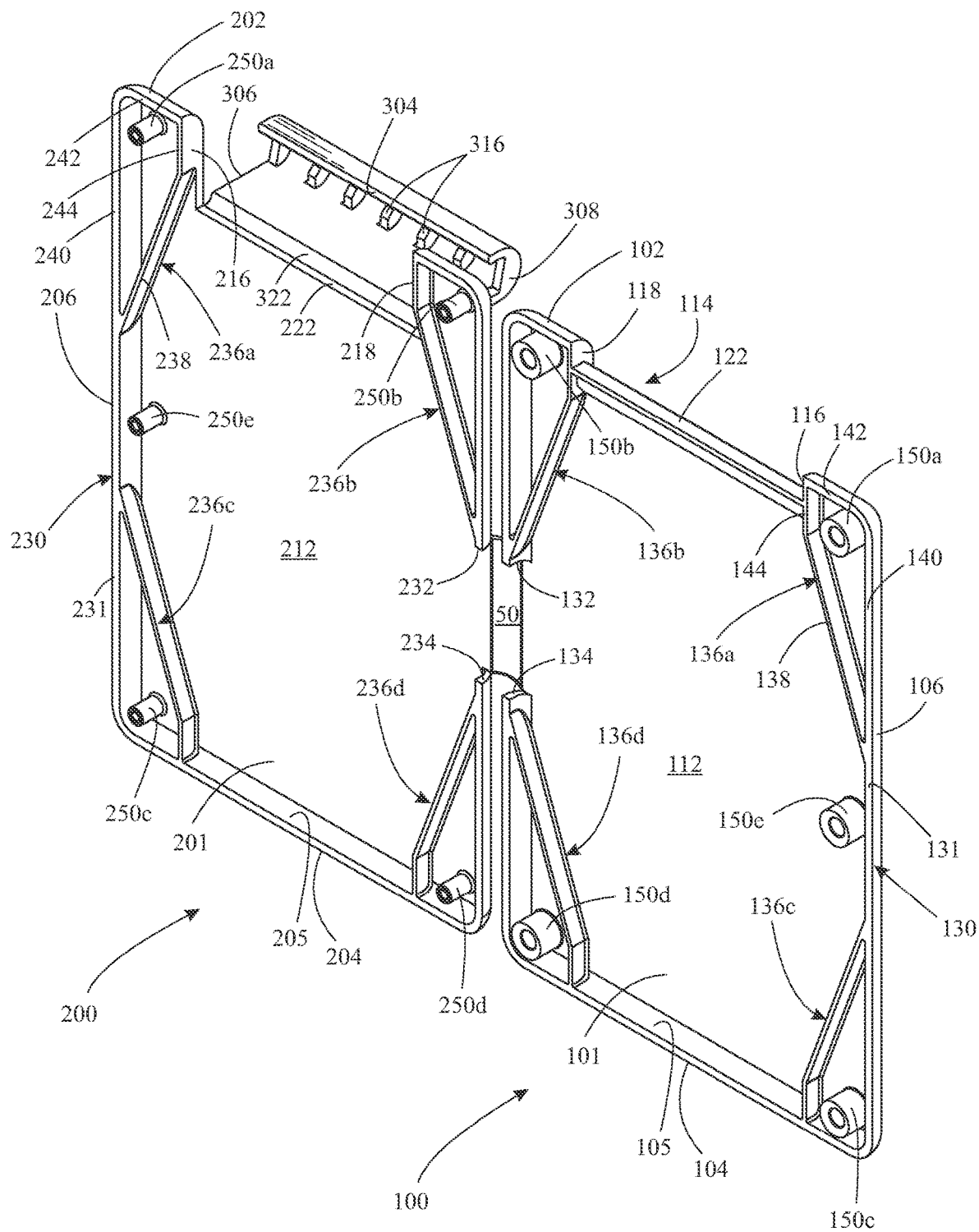
FIG. 7 is an upper-left-rear side perspective view of portable toothpick dispenser 10 with rear housing 200 shown detached from front housing 100 and rotated clockwise about living hinge 50 to display the interior surfaces, 110 and 212, of side-by-side front and rear housings, 100 and 200, respectively, and with child resistant closure 300 in an open and unlocked state.
Figure 8:
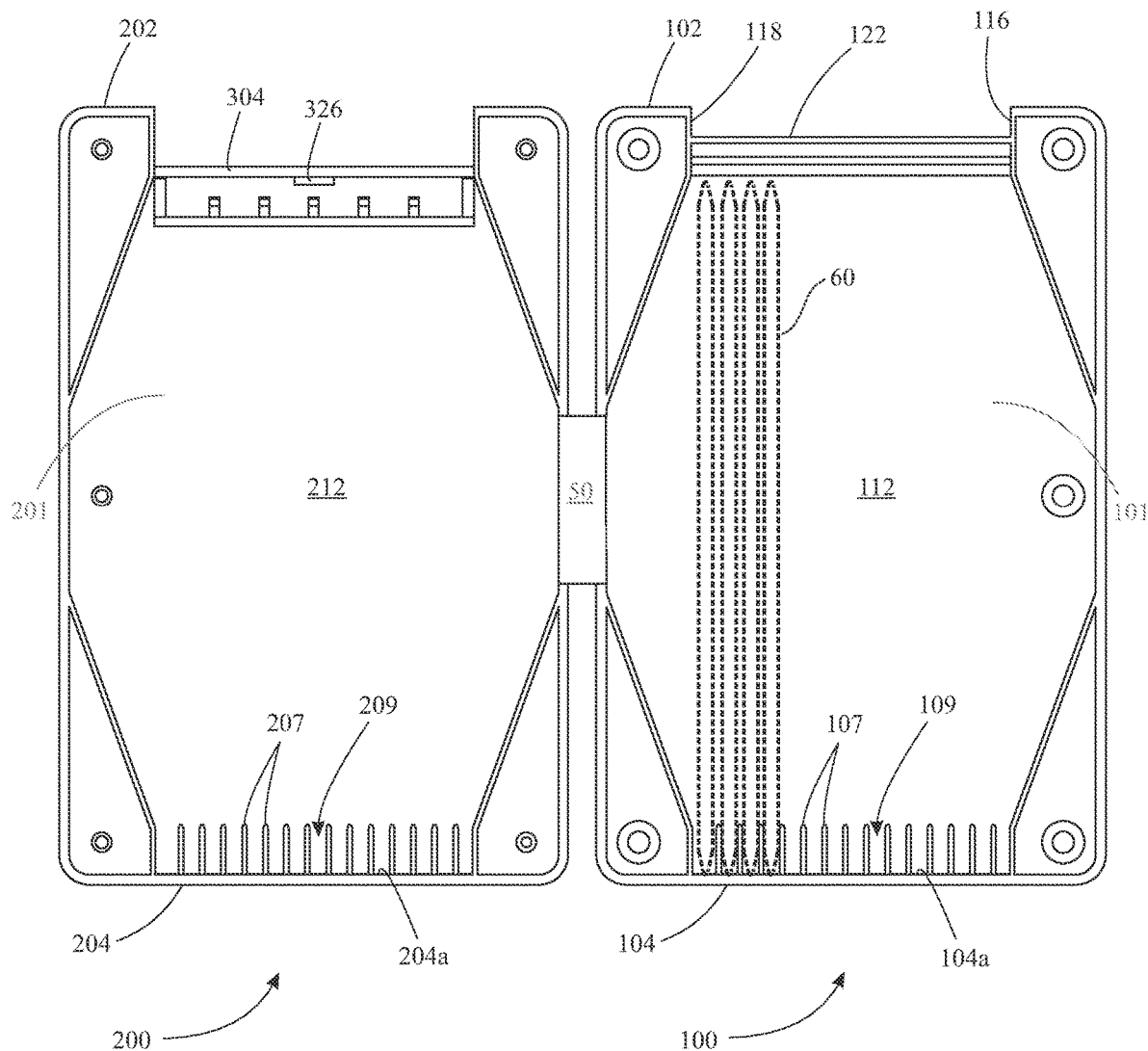
FIG. 8 is a rear elevation view of the portable toothpick dispenser 10 shown in FIG. 7, illustrating the incorporation of spaced toothpick separator walls 107, 207 integrated into the interior surfaces 112, 212 and 105, 205 of side-by-side front and rear housings, 100 and 200, respectively.

In FIGS. 1-5, a portable toothpick dispenser 10 is shown in a fully-assembled, closed/locked state. In this state, access to and dispensing of stored toothpicks is precluded. Generally, portable toothpick dispenser 10 has a clamshell-type housing structure, including a front housing 100 and a rear housing 200, adjoined to one another along a hinged side 18 or portable toothpick dispenser 10 by a living hinge 50. An opposite non-hinged side 16 enables the portable toothpick dispenser 10 to be laid open (e.g., as shown in FIGS. 6-8) to provide interior access (i.e., when child resistant closure 300 is in an open, unlocked condition). A child-resistant closure 300 along an upper end 12 of the toothpick dispenser 10 provides selective access to stored toothpicks 60 (FIG. 8). A lower end 14, opposite upper end 12, is provided having a non-hinged configuration. In FIGS. 6-8, the portable toothpick dispenser 10 is shown in a fully opened state, wherein respective front and rear housing, 100 and 200, are shown completely detached from one another (i.e., except at living hinge 50) in a fully laid open condition—with child resistant closure 300 in an open/unlocked position—to more clearly illustrate structural details.

Referring now generally to FIGS. 1-8, front housing 100 has a generally rectangular front housing panel 101 including rounded corners adjoining an upper end 102, an opposite lower end 104, a non-hinged side 106 and an opposite hinged side 108. At its upper end 102, a recessed portion 114 extending between a first end wall 116 and an opposing second end wall 118 defines a child resistant closure engagement structure (shown generally at 120). That is, closure engagement structure 120 is particularly configured to selectively engage child resistant closure 300 to maintain the housing closure in a closed and locked state, or condition (as shown in FIGS. 1-5). The closure engagement structure 120 may include a vertical wall 122 laterally spanning first and second end walls, 116 and 118, respectively. A first locking feature 126 may be provided projecting from exterior face 124 of vertical wall 122. As further described below, first locking feature 126 is configured for selective locking engagement with a corresponding second locking feature 326 (FIG. 6A) of child resistant closure 300. Laterally extending vertical wall 122 may be adjoined to front housing panel 101 via transition surface 128. Along most of its perimeter, front housing panel 101 of front housing 100 transitions to an interiorly-extending perimeter sidewall (shown generally at 130) terminating at an interiorly-facing edge 131. Front housing panel 101 of front housing 100 is further defined by opposite exterior and interior surfaces, 110 and 112, respectively.

As best shown in FIGS. 7-8, interior surface 112 is partially bounded by interiorly-extending perimeter sidewall 130 (i.e., except where bounded by vertical wall 122 and living hinge 50). A gap is provided along perimeter sidewall 130 between opposing upper and lower sidewall ends, 132 and 134, respectively, where a living hinge 50 is provided adjoining front housing 100 to rear housing 200. Interiorly-projecting corner support structures 136a-136d provide added support proximate to the four corners of front housing 100. Support structure 136a is defined by a contiguous sidewall comprised of perimeter sidewall lengths 140 and 142 and interior corner support structure wall lengths 138 and 144. An annular boss 150a may be provided projecting interiorly from interior surface 112 within the interior surface area bounded by corner support structure 136a. Likewise, additional support structures 136b, 136c and 136d surrounding respective annular bosses 150b, 150c and 150d provide structural support at their respective corners.

Again, referring generally to FIGS. 1-8, rear housing 200 has a generally rectangular rear housing panel 201 including rounded corners adjoining an upper end 202, an opposite lower end 204, a non-hinged side 206 and an opposite hinged side 208. At its upper end 202, a recessed notch 214 extends laterally between first end wall 216 and opposing second end wall 218 for selectively receiving child resistant closure 300 therein. Child resistant closure 300 is preferably in the form of a J-shaped body adjoined at its lower end to edge 222 of recessed notch 214 via living hinge 322. Child resistant closure 300 is further defined by a rounded upper end 302 adjoining a planar front side 310a and a planar rear side 310b. Planar front side 310a terminates at a leading edge 304. Child resistant closure 300 extends laterally between first end 306 and second end 308. Spaced ribs 316 may provide added structural support to child resistant closure 300. As best shown in FIG. 6A, a second locking feature 326 may be provided projecting from an interior surface of a child resistant closure overhang portion, or lip 312. As clearly shown in FIG. 6, lip 312 defines a lateral channel 314 that is sized, shaped, and otherwise configured for selective coupling with child resistant closure engagement structure 120 along upper end 102 of front housing 100. As previously referenced, and further described below, second locking feature 326 may be selectively engaged against the first locking feature 126 projecting from exterior face 124 of vertical wall 122 of front housing portion 100, in order to retain child resistant closure 300 in a closed, locked position. Along most of its perimeter, rear housing panel 201 of rear housing 200 transitions to an interiorly-extending perimeter sidewall (shown generally at 230) terminating at an interiorly-facing edge 231. Rear housing panel 201 of rear housing 200 is further defined by opposite exterior and interior surfaces, 210 and 212, respectively.

As best shown in FIGS. 7-8, interior surface 212 is generally bounded by interiorly-extending perimeter sidewall 230 (i.e., except where bounded by recessed notch 214 and living hinge 50). A gap is defined along perimeter sidewall 230 between opposing upper and lower sidewall ends, 232 and 234, respectively, where a living hinge 50 is provided adjoining rear housing 200 to front housing 100. Interiorly-projecting support structures 236a-236d provide added support proximate to the four corners of rear housing 200, in the same manner as previously described vis-à-vis corner support structures 136a-136d of front housing 100. For example, support structure 236a is defined by a contiguous sidewall comprised of perimeter sidewall lengths 240 and 242, and interior corner support structure wall lengths 238 and 244. An insert post 250a, mateable with annular boss 150a, may be provided projecting interiorly from interior surface 212 within the interior surface area bounded by corner support structure 236a. Likewise, additional corner support structures 236b, 236c and 236d, surrounding respective insert posts 250b, 250c and 250d, provide structural support at their respective corners. One or more additional annular boss 150e and insert post 250e mechanical coupling systems may be employed to provide further integrity of toothpick dispenser 10 when it is in a closed state.

Referring now particularly to FIG. 8, in accordance with some implementations a first series of spaced separator walls 107 may be provided projecting upwardly from interior surface 104a of sidewall 130 at lower end 104, to form a corresponding series of spaced interior toothpick-receiving slots 109 on the interior surface 112 of front housing 100. Likewise, a corresponding second series of spaced separator walls 207 may be provided projecting upwardly from interior surface 204a of sidewall 230 at lower end 204, to form a corresponding series of spaced interior toothpick-receiving slots 209 on the interior surface 212 of rear housing 200. In this manner, when front housing 100 is assembled to rear housing 200 a lower end of stored toothpicks 60 may be retained in a uniformly spaced, upright position and orientation within portable toothpick dispenser 10.

Preferably, portable toothpick dispenser 10 is initially molded from a suitable polymer to form the non-assembled laid open configuration shown in FIGS. 6-8. Subsequently, a plurality of nicotine- and/or flavor-infused disposable toothpicks 60 may be seated against the interior surface 112 of front housing 100 (or, alternatively, against the interior surface 212 of rear housing 200). Then, to create the assembled, closed portable toothpick dispenser configuration shown in FIGS. 1-5, the interiorly-facing side of front housing 100 and the interiorly-facing side of rear housing 200 may be rotated toward one another about living hinge 50, and the annular bosses (150a-150e) and corresponding insert posts (250a-250e) coupled to one another to attach the front and rear housings, 100 and 200, to one another. In this assembled configuration, with child resistant closure 300 in an open, unlocked state (as shown in FIGS. 6-8) a user may easily remove a stored toothpick 60 for use. When child resistant closure 300 is in a closed, locked state (as shown in FIGS. 1-5), closure locking feature 326 is positioned directly beneath corresponding locking feature 126 in an abutting relationship. Once in this closed state, in order to open, or unlock, the child resistant closure 300 a user must simultaneously apply a first force perpendicular to central depressible area 110a of front housing exterior surface 110, and an opposing second force perpendicular to central depressible area 210a of rear housing exterior surface 210 to effectively separate the first and second locking features, 226 and 326, respectively, and thereby enable the child resistant closure 300 to be rotated about its living hinge 322 into the aforementioned open, unlocked position. More specifically, when the child resistant closure 300 is in its locked state, living hinge 322 creates a rotational force urging the closure to rotate rearwardly (i.e., toward exterior surface 210 of rear housing 200) about the living hinge. Consequently, disengagement of the first and second locking features (i.e., while applying concurrent opposing forces against the central depressible areas, 110a and 210a, of the respective front and rear housing exterior surfaces, 110 and 210) causes the child resistant closure 300 to automatically rotate about living hinge 322 and into an open state to enable user access to the packaged toothpicks 60.

A significant benefit of the present invention rests in its unitary molded construction, which provides a one-piece portable toothpick dispenser 10 lending itself to efficient and cost-effective manufacture. Furthermore, the friction fit (or, alternatively, snap fit) annular boss/insert post mechanical coupling system employed to attach the front and rear housings, 100 and 200, respectively, to one another provides the manufacturer with the option of refilling (i.e., with toothpicks) and reusing a previously assembled, used dispenser.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A child resistant portable toothpick dispenser, comprising:
   a rear housing in the form of a generally rectangular and planar rear housing panel having opposite interior and exterior surfaces, the rear housing panel transitioning, about its perimeter, to an interiorly-extending perimeter sidewall, an upper end of said rear housing having a laterally-extending recessed notch provided therein, a laterally-extending edge of said laterally-extending recessed notch attached, via a living hinge, to a child-resistant closure; and
   a front housing in the form of a generally rectangular and planar front housing panel having opposite interior and exterior surfaces, the front housing panel transitioning, about its perimeter, to an interiorly-extending perimeter sidewall, an upper end of said front housing having a laterally-extending, recessed child resistant closure engagement structure configured for selective locking engagement with said child-resistant closure when said portable toothpick dispenser is in a fully-assembled state, a hinged side of said front housing adjoined to a corresponding hinged side of said rear housing by a living hinge to thereby form a clamshell-style toothpick dispenser housing,
   wherein, when said portable toothpick dispenser is in a closed state precluding access to the stored toothpicks, in order to open, or unlock, said child-resistant closure a user must concurrently apply a first force to a central depressible area positioned at a center of said front housing panel exterior surface, and a second force to a central depressible area positioned at a center of said rear housing panel exterior surface in order to disengage said child resistant closure from the recessed child resistant closure engagement structure of said front housing such that the child resistant closure automatically rotates about its living hinge into an open state providing user access to the stored toothpicks.

2. The child resistant portable toothpick dispenser of claim 1, further comprising:
   a plurality of annular bosses formed upon an interior surface of said front housing panel; and
   a plurality of snap inserts formed upon an interior surface of said rear housing panel,
   wherein, when said portable toothpick dispenser is in a fully-assembled state, the plurality of snap inserts frictionally engage the plurality of annular bosses to fixedly attach the front and rear housings to one another to define a toothpick interior storage cavity.

3. The child resistant portable toothpick dispenser of claim 1, wherein:
   said front housing panel further comprises a plurality of interior structure reinforcement walls spanning interior corners thereof; and
   said rear housing panel further comprises a plurality of interior structure reinforcement walls spanning interior corners thereof,
   wherein, when said portable toothpick dispenser is in a fully-assembled state, the plurality of interior structure reinforcement walls of said front housing panel are aligned with and abut the corresponding plurality of interior structure reinforcement walls of said rear housing panel.

4. The child resistant portable toothpick dispenser of claim 1, further comprising:
   a first series of toothpick separator walls projecting upwardly from an interior surface of said rear housing perimeter sidewall.

5. The child resistant portable toothpick dispenser of claim 4, further comprising:
   a second series of toothpick separator walls projecting upwardly from an interior surface of said front housing perimeter sidewall,
   wherein, when said child resistant portable toothpick dispenser is in a fully-assembled state, the first series of toothpick separator walls are aligned with and abut the corresponding second series of toothpick separator walls to define a series of toothpick receiving slots.

6. The child resistant portable toothpick dispenser of claim 2, wherein said child-resistant closure is rotatable about said living hinge between a locked, closed state, wherein access to said toothpick interior storage space is prevented, and an unlocked, open state, wherein a user may access toothpicks within said toothpick interior storage space.

7. The child resistant portable toothpick dispenser of claim 1, wherein said child-resistant closure further comprises:
   a J-shaped closure body having a planar rear side attached at a lower end thereof, via said living hinge, to the lower edge of the laterally-extending recessed notch in the upper end of said rear housing.

8. The child resistant portable toothpick dispenser of claim 7, further comprising a first locking feature projecting from an interior surface of a planar front side of said J-shaped closure body.

9. The child resistant portable toothpick dispenser of claim 8, wherein the child resistant closure engagement structure at the upper end of said front housing further comprises a second locking feature projecting from an interior surface of the front side of said child resistant closure, the first and second locking features selectively engageable with one another between an engaged, locked configuration and a non-engaged, unlocked configuration.

* * * * *